Patented Feb. 13, 1940

2,190,451

UNITED STATES PATENT OFFICE 2,190,451

CELLULOSE DERIVATIVES

Joseph F. Haskins, Wilmington, Del., assignor to E. I. du Pont de Nemours & Company, Wilmington, Del., a corporation of Delaware No Drawing. Application November 9, 1935, Serial No. 49,034. Renewed April 1, 1939

13 Claims. (Cl. 260—231)

This invention relates to cellulose ethers, more particularly to alkoxyalkyl ethers of cellulose, and still more particularly to those alkoxyalkyl ethers which are soluble both in water and in organic solvent.

While British Patent 327,157 discloses the preparation of what is purported to be a triethoxyethyl cellulose by the reaction of ethylating agents upon trihydroxyethyl cellulose, the material is described as insoluble in water, whereas the products of the present invention obtained by the reaction of alkoxyalkylating agents upon cellulose are soluble in water when more than a small amount of lower alkoxyalkyl is introduced.

While cellulose ethers in general including butyl, benzyl, amyl, etc., are insoluble in alkali even in the cold, it has been found that methyl, ethyl and glycol cellulose and cellulose glycolic acid are, when the substituent is present in small amounts, soluble at least in cold alkali. It has now been found that alkoxyalkyl ethers of cellulose—RO cellulose—are likewise soluble, at least, in cold alkali when the ratio of O to C in the RO group is at least 1 to 2; i.e., when they are "lower alkoxyalkyl" celluloses.

The solubility of the ethers of this class of lower alkoxylalkyl celluloses ranges from solubility at very low substitutions only in cold or even freezing alkali thru solubility in alkali at room temperature and insolubility in water, then thru solubility in cold water, then solubility in tepid or even in some cases, boiling water.

The lower alkoxyalkyl celluloses when highly substituted are not only soluble in alkali and water, but are also soluble in a large number of organic solvents including aromatic hydrocarbons, such as toluene, xylene, benzene, chloroform, dioxane, ethyl acetate, pyridine, etc.

This invention has as an object the preparation of new cellulose derivatives. A further object is the preparation of lower alkoxyalkyl ethers of cellulose soluble in water and also in organic solvents. A still further object is the preparation of lower alkoxyalkyl ethers of cellulose of a low degree of substitution, the same being soluble in alkali but not in water, or soluble in cold alkali but not in water or alkali at room temperature.

These objects are accomplished by the following invention wherein cellulose is reacted in the presence of a base with a lower alkoxyalkylating agent in an amount of at least two mols per glucose unit of the cellulose, the alkoxyalkylation being stopped after the material becomes soluble in water; or in the case of the low substituted derivatives with up to about one mol of the alkoxylating agent per glucose unit of the cellulose, the alkoxyalkylation being stopped when the product reaches the desired solubility in alkali.

A particularly preferred class of ethers of the present invention is that wherein the ethers are soluble in water and also soluble in organic solvents. Ethers of this class may be prepared by reacting an alkali cellulose, for example that prepared by impregnating celulose with alkali solutions of 20 to 70% concentration and pressing to a press weight of 3 to 8, preferably 7.5 (with 35% sodium hydroxide) with at least two mols and up to 9, 12 and even more mols of lower alkoxyalkylating agent per glucose unit of the cellulose. With ethoxyethyl chloride the use of 9 mols per glucose unit for eight hours at 125° C. gives a product soluble in water up to about 30°-40° C. while higher molar concentrations of ethoxyethyl chloride give products more soluble even at more elevated temperatures. Ethers of this class are illustrated by the following examples which are to be taken as illustrative and not as limitative.

EXAMPLE 1.—$\beta$-ethoxyethylcellulose. Soluble in water and in organic solvents One hundred parts of cotton linters were steped in 35% sodium hydroxide solution, pressed to 741 parts and shredded. This alkali cellulose was placed in a nickel-lined autoclave with 782 parts of $\beta$-ethoxyethyl chloride and 329 parts dioxane and the mixture heated for 9 hours at 150° C. The reaction product was dissolved in water, dilute HCl was added to neutralize the excess caustic, and the solution was evaporated to dryness. The dried residue was dissolved in a mixture of 50 parts toluene and 50 parts ethanol and the solution was filtered. This solution on evaporation gave a film of considerable strength and toughness. This $\beta$-ethoxyethylcellulose was soluble in water below 5° C. to a clear solution. Above that temperature the solution became turbid but was filterable. It was also soluble in a mixture of toluene and alcohol.

EXAMPLE 2.—$\beta$-ethoxyethylcellulose. Soluble in cold water but not in hot water Seven hundred and twenty parts of alkali cellulose prepared by steeping 100 parts of cotton linters in 37% sodium hydroxide solution pressing to 720 parts and shredding were placed in an autoclave along with 613 parts of $\beta$-ethoxyethyl chloride and 200 parts of benzene and heated at 125° C. for eight hours. The reaction mixture was poured slowly into boiling water to remove the benzene which boiled off. By filtering while hot there was little loss of material. This partially purified product was further purified by dialysis of the aqueous solution, and freed from water by evaporation. The residue was soluble in water up to about 30-40° C. but insoluble in hot water. It was also soluble in a mixture of 50 parts toluene and 50 parts alcohol, in ethanol, methanol, ethyl acetate, beta-ethoxyethanol and pyridine. It was difficultly soluble or highly swollen in butanol, butyl acetate, acetone, or chloroform, and insoluble in ether, carbon tetrachloride, butyl chloride, toluene, benzene, or aliphatic hydrocarbons.

EXAMPLE 3.—$\gamma$-methoxypropylcellulose. Soluble in water

Forty-eight parts of alkali cellulose prepared as in Example 1 were treated for 9 hours at 150° C. in a nickel autoclave with a solution of 38 parts of gamma-methoxypropyl chloride in 16 parts of benzene. The reaction product was dissolved in a 50—50 toluene-alcohol mixture, the solution dried by adding solid anhydrous potassium carbonate, filtered and evaporated to dryness. The product so secured was soluble in water, hot or cold, and in many organic solvents, such as pyridine, toluene-50-alcohol 50, and chloroform.

EXAMPLE 4.—$\beta$-methoxyethylcellulose. Soluble in water

Forty-five parts of alkali cellulose prepared as in Example 1 were treated for eight hours at 150° C. with 34 parts of beta-methoxyethyl chloride, using 16 parts of benzene as a diluent. The reaction product was purified by dissolving in a 50—50 mixture of toluene and ethanol, drying with anhydrous sodium carbonate, filtering and evaporating the solution to dryness. The beta-methoxyethylcellulose so prepared is soluble in water to give a clear solution below 25° C. and a slightly turbid solution between 25° C. and 100° C. It is soluble in alcohol, chloroform, methanol, and pyridine; swollen by ethyl acetate, ethylene glycol monoethyl ether, acetone, and butanol; and insoluble in toluene, ether, and aliphatic hydrocarbons.

A further important class of ethers is that of the low substituted lower alkoxyalkyl ethers of cellulose which are soluble in alkali at least at low temperatures. These are prepared by employing up to two mols of the alkoxyalkylating agent per glucose unit of the cellulose and stopping the alkoxyalkylation when alkali solubility is reached.

EXAMPLE 5.—$\beta$-ethoxyethylcellulose. Low substituted and soluble in alkali

To 360 g. of ethylene glycol monoethyl ether cooled to 0° C. were added slowly and with stirring 406 g. of chlorosulfonic acid. The reaction product was slowly neutralized at 0° to 15° C. with a suspension of 160 g. of sodium hydroxide in anhydrous methanol. The reaction mixture was evaporated to dryness at 70° C. to give sodium beta-ethoxyethylsulfate.

One hundred and twenty grams of wood pulp were steeped in 19% sodium hydroxide solution, pressed to 360 g. and shredded for 16 hours at 25° C. with one fourth of the sodium ethoxyethylsulfate prepared above. The mixture was allowed to react further in an atmosphere of nitrogen for 42 hours at 70° C. without agitation. The resulting reaction product was purified by washing with water. The product was insoluble in alkali at room temperature, in water, and in organic solvents, but with refrigeration was soluble in 6% to 9% sodium hydroxide solution. The solution so obtained was stable at room temperature and could be coagulated by means of a sulfuric acid-sodium sulfate bath to give a clear, transparent film, insoluble in water or organic solvents.

EXAMPLE 6

The reaction was carried out exactly as in Example 5 except that the reaction mixture was kept for 96 hours at 70° C. After purification this product proved to be soluble in 6% sodium hydroxide solution at room temperature but was insoluble in water and in organic solvents.

EXAMPLE 7

The reaction was carried out exactly as in Example 5 except that the alkoxyalkylating agent was obtained by reacting 134 grams of ethoxyethoxyethanol with 101.5 grams of chlorosulfonic acid, neutralizing the product with a suspension of 40 grams of sodium hydroxide in absolute methanol and evaporating to dryness, the whole being employed in the etherification.

EXAMPLE 8.—$\beta$-methoxyethylcellulose. Soluble in alkali

Two hundred and fifty parts of ethylene glycol monomethyl ether were treated with 348 parts of chlorosulfonic acid as described in Example 5, the reaction product neutralized with a suspension of 200 parts of sodium hydroxide in absolute methanol, the solution evaporated to dryness and dried at 70° C.

Eighty parts of wood pulp were steeped overnight in 475 parts of 19% sodium hydroxide solution to which had been added ⅕ of the sodium methoxyethyl sulphate prepared above. The pulp was then pressed to 250 parts and shredded, ₁/₁₀ of the sodium methoxyethyl sulphate prepared above being shredded in. It was then allowed to react further, without agitation, at 70° C. in an atmosphere of nitrogen for 48 hours and purified by washing with hot water. The dried product was found to be soluble in 9% sodium hydroxide, but insoluble in water.

Mixed alkyl alkoxyalkyl ethers and alkoxyalkyl ethers of cellulose RO-cellulose where the ratio of oxygen to carbon in the RO group is less than 1 to 2; i. e., "higher alkoxyalkyl ethers" may be prepared as in the following examples. These are included to demonstrate that higher alkoxyalkyl celluloses and lower alkoxyalkyl celluloses which also contain simple alkyl groups are insouble in water when the amount of simple alkyl is substantial; e. g., one mol ethyl per glucose unit.

EXAMPLE 9.—Ethyl $\beta$-butoxyethylcellulose

Forty-eight parts of alkali cellulose prepared as in Example 1 were heated for 9 hours at 150° C. with 50 parts of beta-butoxyethyl chloride and 3 parts of ethyl chloride, using 16 parts of benzene as a diluent. The product of the reaction was dissolved in a mixture of equal parts of toluene and alcohol and the solution dried over anhydrous potassium carbonate. Upon evaporation this solution yielded a soft, flexible film of ethyl beta-butoxyethylcellulose, highly swollen by water at 25° C. but insoluble therein.

EXAMPLE 10.—*Ethyl β-ethoxyethylcellulose. Insoluble in water*

One hundred grams of cotton linters were steeped in 50% sodium hydroxide solution, pressed to 550 g. and shredded. The alkali cellulose so prepared was treated, in a nickel autoclave, at 135° C. for 6 hours with 204 g. of beta-ethoxyethyl chloride and 243 g. of ethyl chloride using 200 g. of benzene as a diluent. Mechanical agitation was provided. The product was purified by steam distillation and washing with hot water to yield a granular ethyl ethoxyethylcellulose insoluble in hot or cold water but soluble in organic solvents such as alcohol, acetone, ethyl acetate, ethoxy ethanol, pyridine, butanol, and butyl acetate. It was highly swollen in methanol, chloroform, carbon tetrachloride, ether, and benzene, and was only slightly swelled by toluene or aliphatic hydrocarbons.

EXAMPLE 11.—*Benzyl β-methoxyethylcellulose. Insoluble in water*

One hundred grams of cotton linters were steeped in 50% alkali, pressed to a weight of 328 g., and shredded, 122 g. of solid sodium hydroxide being added during the process. This alkali cellulose was treated for 8 hours at 150° C. with 306 g. of beta-methoxyethyl chloride, 114 g. of benzyl chloride, 136 g. of water, and 180 g. of benzene. The reaction product was purified by steaming out the benzene, etc., and washing with water. This benzyl methoxyethylcellulose was soluble in organic solvents but quite insoluble in water.

EXAMPLE 12.—*Ethyl phenoxyethoxyethylcellulose*

Forty-eight parts of alkali cellulose prepared as in Example 1 were treated in a nickel autoclave for 9 hours at 150° C. with 64 parts of phenoxyethoxyethyl chloride

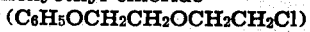
(C₆H₅OCH₂CH₂OCH₂CH₂Cl)

and 3 parts of ethyl chloride using 16 parts of benzene as a diluent. The product was dissolved in benzyl alcohol, reprecipitated by pouring the solution into methanol and then washing with hot water. This product as soluble in organic solvents such as toluene 90%-alcohol 10%, but not in water.

Mixed alkylalkoxyalkyl cellulose soluble in water may be prepared by introducing only a small amount of alkyl group as is disclosed by the following examples:

EXAMPLE 13.—*Ethyl β-ethoxyethylcellulose. Soluble in cold water*

Forty-eight parts of alkali cellulose, prepared as in Example 1 were treated with 30 parts of beta-ethoxyethyl chloride and 6 parts of ethyl chloride, using 16 parts of benzene as a diluent, at 150° C. for 6 hours in a nickel autoclave. The reaction product was dissolved in cold water, the solution so obtained was heated to boiling and filtered rapidly. The product was purified by further treatment with hot water. This ethyl ethoxyethylcellulose was soluble in cold water but insoluble in hot water and was also soluble in a 50—50 mixture of alcohol and toluene to give a viscous solution.

EXAMPLE 14.—*Ethyl β-methoxyethylcellulose. Soluble in cold water*

One hundred grams of cotton linters were steeped in 40% sodium hydroxide solution, pressed to 660 g., and shredded. The alkali cellulose so prepared was treated for 7 hours at 150° C. with 440 g. of beta-methoxyethyl chloride and 94 g. of ethyl chloride. The reaction product was poured into rapidly boiling water, filtered out, and dried. The ethyl methoxyethylcellulose so prepared was soluble in cold water but not in hot. It was also soluble in a 50—50 mixture of alcohol and toluene.

EXAMPLE 15.—*Butyl β-ethoxyethylcellulose. Soluble in cold water*

Twenty-four parts of alkali cellulose prepared as in Example 1 were treated in a stainless-steel autoclave at 150° C. for 9 hours, with 3.5 parts of butyl chloride and 15.5 parts of beta-ethoxyethyl chloride, using 8 parts of dioxane as a diluent. The reaction product was purified by steaming and washing with hot water in which it was insoluble. This butyl ethoxyethylcellulose was soluble in cold water but not in hot water. It was also soluble in organic solvents as, for example, a 50—50 mixture of toluene and alcohol.

EXAMPLE 16.—*Ethyl β-methoxyethylcellulose*

Wood pulp was steeped in 40% sodium hydroxide solution and pressed to a press weight of 6.6. Forty-two parts of this alkali cellulose were placed in a nickel autoclave with 28 parts of β-methoxyethyl chloride, 6 parts of ethyl chloride and 16 parts of benzene. The mixture was heated to 150° C. for 7 hours. The product was purified as in Example 3. This ethyl β-methoxyethylcellulose, containing a relatively small proportion of ethyl, was soluble in water up to about 85° C. Above that temperature a part of such solution would separate out.

The simple lower alkoxyalkyl ethers containing a substantial amount of alkoxyalkyl substituent are suitable for sizing textiles, adhesives, emulsifying agents and the like. Because of the solubility of these ethers both in water and in organic solvents, they are particularly suited for use as emulsifying agents, while water soluble cellulose derivatives hitherto known to the art have had in general a very poor range of solubility in organic solvents and a correspondingly diminished field of utilization. Low substituted lower alkoxyalkyl celluloses soluble in alkali but not in water such as are described in Examples 5, 6, and 7 are suitable for the preparation of films and filaments by coagulation of the alkaline solution by means of a suitable coagulation bath.

The term lower alkoxyalkyl as used in the specification and claims is meant to include those ethers of cellulose wherein a portion of the cellulose hydroxyls are replaced by lower alkoxyalkyl groups RO wherein R contains ether oxygen atoms and carbon atoms and the ratio of ether oxygen to carbon in RO is at least 1 to 2; R thus includes methoxyethyl, methoxyethoxyethyl, ethoxyethyl, ethoxyethoxyethyl, methoxypropyl, etc. The expression "ether oxygen" is used herein to define the oxygen atom of a true ether and not that of an acetal wherein two oxygen atoms are attached to the same carbon atom.

The lower alkoxyalkyl ethers of cellulose as above defined are prepared by the action of a lower alkoxyalkylating agent corresponding to the ether group to be introduced, on cellulose in the presence of an alkali metal hydroxide, such as sodium or potassium hydroxide. Various kinds of cellulose may be employed including hydrocellulose, oxycellulose, regenerated cellulose, cellulose pretreated to a slight extent; e. g., with formic, acetic or other acid. Lower alkoxyalkylating agents, in general, may be employed, such as the halides; e. g., the bromides and chlorides, the sulfates and particularly the monosulfates, and the arylsulfonates and particularly the p-toluenesulfonates of methoxyethanol, ethoxyethanol, ethoxyethoxyethanol, methoxypropanol, etc.

It should be pointed out that the products described herein, which are water soluble, are also soluble in dilute (for example, 6-9% alkalies, both at room temperature and on cooling and that those products which are insoluble in water but soluble in dilute alkalies at room temperature are also soluble in dilute alkali on cooling.

The above description and examples are intended to be illustrative only. Any modification of or variations therefrom which conforms to the spirit of the invention is intended to be included within the scope of the claims.

I claim:

1. Process of preparing ethoxyethylcellulose soluble in water, alkali and organic solvents which comprises steeping 100 parts of cellulose in excess 35% sodium hydroxide, pressing to 741 parts, shredding, reacting with 782 parts of ethoxyethyl chloride in 329 parts of dioxane for nine hours at 150° C. and isolating the resulting ethoxyethylcellulose.

2. An ethoxyethylcellulose soluble in water, cold dilute alkali and organic solvents and being in the form obtainable by steeping 100 parts of cellulose in excess 35% sodium hydroxide, pressing to 741 parts, shredding, reacting with 782 parts of ethoxyethyl chloride in 329 parts of dioxane for nine hours at 150° C. and thereafter separating the by-products of the reaction from the ethoxyethylcellulose.

3. Process of preparing low substituted alkoxyalkyl ethers of cellulose insoluble in cold dilute aqueous alkali at low temperatures, said ethers having a portion of the cellulose hydroxyls replaced by the group RO, wherein R contains at least one ether oxygen atom and wherein the ratio of ether oxygen atoms to carbon atoms in the group RO is less than one to two which comprises reacting cellulose in the presence of an alkali metal hydroxide with sodium alkoxyethyl-sulfate, and separating the by-products of the reaction from the resultant cellulose ether.

4. Process of preparing lower alkoxyalkyl ethers of cellulose soluble at least in alkali at low temperatures, said ethers having a portion of the cellulose hydroxyls replaced by the group RO, wherein R contains ether oxygen atoms and wherein the ratio of ether oxygen atoms to carbon atoms in the group RO is at least one to two which comprises reacting cellulose in the presence of an alkali metal hydroxide with sodium alkoxy-ethyl sulfate and discontinuing the etherification after the product becomes soluble at least in cold alkali but before the product has passed out of the water soluble stage.

5. Process of preparing beta-ethoxy-ethylethers of cellulose soluble at least in alkali at low temperatures, said ethers having a portion of the cellulose hydroxyls replaced by the group RO, wherein R contains ether oxygen atoms and wherein the ratio of ether oxygen atoms to carbon atoms in the group RO is at least one to two which comprises reacting cellulose in the presence of an alkali metal hydroxide with sodium beta-ethoxy-ethyl-sulfate, and discontinuing the etherification after the product becomes soluble at least in cold alkali but before the product has passed out of the water soluble stage.

6. Process of preparing beta-ethoxy-ethyl ethers of cellulose soluble at least in alkali at low temperatures, said ethers having a portion of the cellulose hydroxyls replaced by the group RO, wherein R contains ether oxygen atoms and wherein the ratio of ether oxygen atoms to carbon atoms in the group RO is at least one to two which comprises reacting cellulose in the presence of an alkali metal hydroxide with beta-ethoxyethyl chloride, and discontinuing the etherification after the product becomes soluble at least in cold alkali but before the product has passed out of the water soluble stage.

7. Process of preparing beta-ethoxy-ethyl ethers of cellulose soluble at least in alkali at low temperatures, said ethers having a portion of the cellulose hydroxyls replaced by the group RO, wherein R contains ether oxygen atoms and wherein the ratio of ether oxygen atoms to carbon atoms in the group RO is at least one to two which comprises reacting cellulose in the presence of sodium hydroxide with beta-ethoxy-ethyl chloride, and discontinuing the etherification after the product becomes soluble at least in cold alkali but before the product has passed out of the water soluble stage.

8. Process of preparing beta-ethoxy-ethyl ethers of cellulose soluble at least in alkali at low temperatures, said ethers having a portion of the cellulose hydroxyls replaced by the group RO, wherein R contains ether oxygen atoms and wherein the ratio of ether oxygen atoms to carbon atoms in the group RO is at least one to two which comprises reacting cellulose in the presence of an alkali metal hydroxide with beta-ethoxyethylating agent, and discontinuing the etherification after the product becomes soluble at least in cold alkali but before the product has passed out of the water soluble stage.

9. Process of preparing beta-ethoxy-ethyl ethers of cellulose soluble at least in alkali at low temperatures, said ethers having a portion of the cellulose hydroxyls replaced by the group RO, wherein R contains ether oxygen atoms and wherein the ratio of ether oxygen atoms to carbon atoms in the group RO is at least one to two which comprises reacting cellulose in the presence of an alkali metal hydroxide with an alkoxy alkylating agent, the alkyl residue of which has not less than 2 and not more than 3 carbon atoms, and discontinuing the etherification after the product becomes soluble at least in cold alkali but before the product has passed out of the water soluble stage.

10. Process which comprises steeping 100 parts of cotton linters in 35% sodium hydroxide solution, pressing to 741 parts, shredding, reacting with 782 parts of beta-ethoxy-ethyl chloride in the presence of 329 parts dioxane by heating the mixture for 9 hours at 150° C., dissolving the reaction product in water, neutralizing the excess caustic with dilute hydrochloric acid, evaporating to dryness, dissolving in a mixture of 50 parts toluene and 50 parts ethanol, filtering, and thereafter evaporating the solvent.

11. The cellulose derivative of claim 10 having beta-ethoxy-ethyl substituents and being soluble in a 50—50 mixture of toluene and ethanol.

12. Process of preparing lower alkoxy-alkyl ethers of cellulose soluble in dilute aqueous caustic alkali at least at low temperatures, which comprises replacing a portion of the cellulose hydroxyls by the group RO, wherein R contains ether oxygen atoms, wherein the ratio of ether oxygen atoms to carbon atoms in the group RO is at least one to two and wherein the alkyl residue nearest the cellulose nucleus has not less than two and not more than three carbon atoms, by reacting cellulose in the presence of an alkali metal hydroxide with an etherifying agent whose residual radical is a member of the group consisting of methoxyethyl, methoxyethoxyethyl, ethoxyethyl, ethoxyethoxyethyl and methoxypropyl, and discontinuing the etherification reaction after the product becomes soluble in dilute aqueous caustic alkali at least in the cold but before the product has passed out of the water soluble stage.

13. The product of claim 12 which is a cellulose ether having only alkoxyalkyl substituents and which is soluble in dilute aqueous caustic soda of 6% to 9% concentration at least at low temperatures.

JOSEPH F. HASKINS.